Aug. 16, 1932.                B. BART                1,871,770
METHOD OF DEPOSITING ON CHROMIUM
Filed Aug. 24, 1929
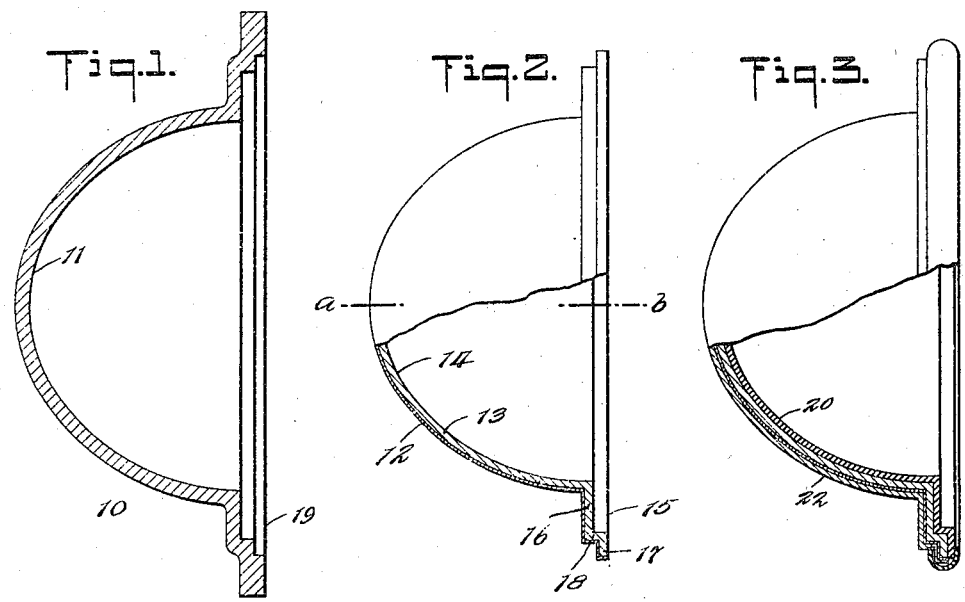
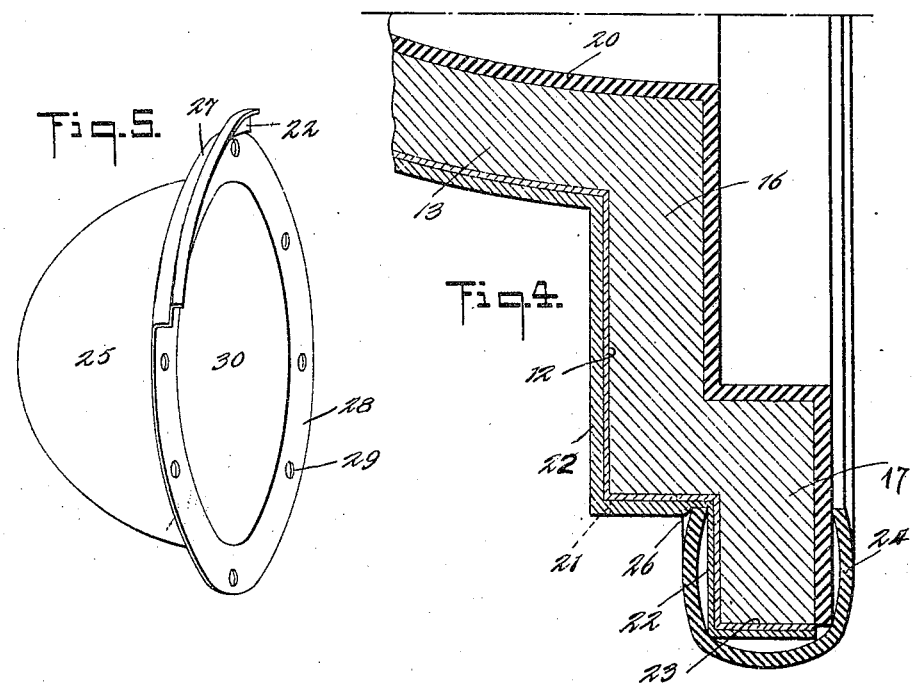
INVENTOR
BLASIUS BART
BY Warren S. Orton
ATTORNEY Patented Aug. 16, 1932

1,871,770

UNITED STATES PATENT OFFICE

BLASIUS BART, OF EAST ORANGE, NEW JERSEY, ASSIGNOR TO THE FRINK CORPORATION, OF LONG ISLAND CITY, NEW YORK, A CORPORATION OF DELAWARE

METHOD OF DEPOSITING ON CHROMIUM

Application filed August 24, 1929. Serial No. 388,231.

The invention relates in general to an improvement in the art of forming articles by electrolytic precipitation and the invention particularly relates to the art of producing three dimension facsimiles, such as parabolic reflectors accurate to molecular proportions and which are required to have a capacity to reflect the greatest amount of light imposed on the same or parts of the same.

The invention relates to an improvement in the method of forming metallic reflectors and similar articles by electrolytic deposition and particularly in the method of forming working molds on which said reflectors and other finished articles are formed, and the invention also relates to apparatus designed for use in practicing such methods.

In the art of producing parabolic reflectors and similar objects which were required to be produced with mathematical exactness in their several dimensions, particularly in their necessity for reproducing highly polished surfaces capable of reflecting all or substantially all of the light imposed thereon, it has been required heretofore that there be first produced a suitable master mold with a metal receiving surface which was the exact complement of the metal surface to be formed. It has been regarded in the art as necessary heretofore that such molds be formed of glass for no other material apparently could be produced which would give the requisite smoothness of surface and at the same time even approach the requisite accurately defined surface capable of receiving the electrolytic precipitation of the mold which was to form the reflecting and other desired configuration of surface. The cost of producing glass molds is well nigh prohibitive due to cost of accurate grinding and glass molds cannot be produced accurately at a price which will insure a satisfactory manufacturing product. Glass molds have other objectionable features; they develop a porous surface and after repeated resilvering chips break away from the silver surface.

Efforts have been made to meet this problem by the use of metal molds but these attempts have failed, among other reasons, due to the fact that it was necessary to expend much labor in polishing each mold. Polishing is often responsible for modifications sufficient to destroy the requisite form of the finally finished article. Further corroding and oxidizing quickly affected the light reflecting character of such known metal surfaces after they had been in use for some time. Attempts have been made to protect these metal surfaces from corroding and from other deteriorating action usually by coating them with some form of lacquer, sometimes with wax or other thin medium, but such coating seriously affected the appearance of the resulting surface so that the desired brilliancy of reflecting surface could not be obtained. Besides any such method which added something to the mold surface had the disadvantage in that each mold had to be coated or otherwise treated after each succeeding use, thus adding to manufacturing costs.

Accordingly, the primary object of the invention is to provide a method of procedure for forming accurately defined reflectors and other articles, particularly those which require brilliant reflecting surfaces, and at the same time, to avoid the abjections which have heretofore been inherent in the use of glass and metal molds. Differently expressed, the invention features a method for reproducing accurately a large number of reflectors or other articles particularly tridimensional articles, each of which will be an exact facsimile of the other and each corresponding exactly to the surface characteristics, proportions and configurations of a master mold.

Still another object of the invention is to provide a working mold as an exact facsimile of the master mold and which working mold may be retained practically indefinitely with a non-corroding, non-oxidizing surface having the smoothness characterizing a highly polished metallic surface and which mold can be used repeatedly without necessity of repolishing or retreating it in any way between succeeding uses.

Broadly, these objects are attained by depositing, electrolytically, on a highly polished master mold, a layer of non-corroding fine grain metal, such as chromium, positioning a backing layer on the chromium layer to form a working mold and if desired, duplicating this process until any desired number of working molds are formed from the master mold. The working molds so produced are used repeatedly as cathodes in electrolytic baths to form facsimiles of the master mold. It is a feature of this disclosure that after once being subjected to a hydrogenizing treatment these working molds are used repeatedly without necessity of any subsequent or intermediate treatment.

The invention also features the use of insulating means for blocking off the deposits from portions of such working molds on which deposits are not desired; the providing of means for preventing flaking or peeling off of the metallic layers deposited on the working mold and for temporarily retaining the deposited layer on the mold until the requisite thickness of deposit is attained.

Various other objects and advantages of the invention will be in part obvious from a consideration of the method features of the disclosure and from an inspection of the accompanying drawing and in part will be more fully set forth in the following particular description of one method of practicing the invention, and the invention also consists in certain new and novel modifications of the preferred method and other features of construction and combinations of parts hereinafter set forth and claimed.

In the accompanying drawing,

Fig. 1 is a view largely in diagrammatic outline of a master mold shown in axial section and illustrating apparatus for use in the method of forming the working mold herein featured;

Fig. 2 is a view partly in side elevation and partly in section, of a working mold formed in part on the master mold shown in Fig. 1 and illustrating the metallic part of the mold without the insulating blocking off features;

Fig. 3 is a view similar to Fig. 2 showing the mold of Fig. 2 in the next succeeding step in the method with an initial part of the final article forming layer and with the insulating blocking off elements in place;

Fig. 4 is an enlarged detailed view showing the lower portion of Fig. 3 and showing the final stage of the metal depositing step; and Fig. 5 is a view in perspective of a metallic reflector constituting the product produced by following the method herein featured and with part of the securing flange shown in Fig. 4 cut away.

In practicing the invention, it is, of course, necessary to first prepare a master mold such as is illustrated in Fig. 1 and the preparation of the original mold must be done carefully and with such caution as to give the accuracy desired in the resulting reflectors and other facsimiles made therefrom. However, after the first master mold has been completed, the working molds taken therefrom can be made cheaply and without the necessity of the expense and effort inherent in the preparation of the master molds. The initial mold may be designed, cast, made up of different parts, welded together, machined, polished and otherwise manufactured in accordance with the approved practices known in this art. It is herein suggested that the master mold 10 be formed of a non-fusible metal, preferably a fine grain iron or tool steel, or, preferably, it may be made of electrolytically deposited nickel. It is also suggested that other metals can be used as well as non-metallic substances such as celluloid. In any case, the mold 10 has a deposit receiving surface 11 accurately defined to form the complement of the surface to be reproduced. It is a feature of this disclosure that such surface must be highly polished, particularly where it is to define the brilliancy of the resulting reflecting surface. The master mold thus produced and polished is designed and constructed with the necessary supporting parts in order to constitute the cathode element in an electrolytic bath to receive thereon a deposit of metal which will constitute eventually the metal receiving surface of the working mold. This metal deposit may be, or may form part of, the reflector or other final article desired to be produced, but better results are attained, especially when large numbers of facsimiles are to be produced, when the master mold is used simply to form other molds hereinafter referred to as working molds and such other working molds may be utilized to form the final article.

The master mold is positioned in an electrolytic tank containing an electrolyte capable of forming a non-corroding, brilliant reflecting surface. While several metals may be used, such as platinum or any metal of the platinum group, it has been found that the best practical results are obtained by using the metal chromium in the solution. In this way there is produced a chromium shell 12 such as is shown in Fig. 2, which is preferably formed as an extremely thin layer of the order of about 0.001 to 0.005 of an inch. On this chromium layer, while in engagement with the master mold, there is formed a backing or strengthening layer of any approved form. It is herein suggested that a backing layer 13 be formed of nickel deposited electrolytically and of a thickness to give sufficient rigidity to the mold so as to maintain its configuration when removed from the master mold. In the particular form herein selected for illustration, the working mold includes the layer 13 hereinafter referred to as a form with its thin chromium facing 12. The form is of a dish or hat shaped configuration and comprises a central curved parabolic portion 14 outlined by a Z-shape 15. The Z-shape is formed in effect by an inner flange 16 constituting a flanged edge to the parabolic portion 14 and an outer flange 17. The two flanges extend in parallel planes and are connected by an intermediate rim or transverse flange 18 concentrically disposed relative to the axis *a—b* of the parabolic portion 14. It will be understood that this peculiar configuration is due to the corresponding configuration of the recess portions 19 of the master mold 10.

The working mold as thus far completed has positioned on its rear face a layer of insulating material 20 designed to constitute a means for blocking off the deposition from forming on the rear side of the mold. This layer 20 may be a layer of hard rubber or celluloid, permanently fixed to the form 13 following conventional practices in this respect, but is preferably a removable sheet of some suitable form of insulating material temporarily held to the form by cement or other suitable fastening means.

It is understood that the layer 12 of chromium is intentionally made thin and any such thin layer is quite apt to be dissolved if subjected for any material length of time, to the action of certain electrolytes in which it is intended that the mold shall be used in producing the finished article. It is also a fact that certain metals, such as silver, when deposited on the chromium faced mold, develops a tendency, particularly during the initial part of the depositing operation, to fail to adhere to the chromium face of the mold. In order to insure the maintenance of the deposited layer on the chromium faced mold, the flanges 17 and 18 are provided and are constructed so as to extend beyond the outline of the finished article which terminates at the dotted line 21 shown in Fig. 3.

The metal mold with its layers 12 and 13 as shown in Fig. 2, with the backing insulating layer 20 shown added thereto in Fig. 3, is positioned in an electrolytic tank containing the electrolyte of the metal which is desired on the finished article. This metal may be silver, nickel, cooper, or any other metal usually used in electrolytic baths. In the instant case, it is to be understood that a metal is used which is of a fine grain texture, capable of producing a highly reflective surface. Silver or palladium or the alloy disclosed in my pending application Serial No. 283,997 filed June 8, 1928, is suggested.

The first time the working mold is used and when in the form shown in Fig. 2, it is subjected to a hydrogenizing treatment, but it is a feature of this disclosure that after the mold has been once subjected to this hydrogenizing treatment, it can be used repeatedly without necessity of any subsequent similar treatment.

It is suggested that the hydrogenizing treatment consists in positioning the chromium faced working mold shown in Fig. 2 to the action of an electrolytic bath containing three to ten percent normal solution of sulphuric acid for a period of about ten to thirty seconds; in the presence of current at 6 to 12 volts and with 20 to 50 amperes per square foot. Another and quicker method which is not as effective, is to dip the mold into dilute hydrochloric acid for a second or two.

With the mold having its surface so hydrogenized and with the backing layer 20 in place as shown in Fig. 3, it is subjected to the action of the electrolytic bath for a short time, usually a couple of minutes in the case of silver, until an extremely thin initial layer 22 is formed on the exposed face of the mold as particularly shown in Fig. 3 and on the flange 17 of Fig. 4. It will be noted that this thin layer extends not only across the parabolic portion and along the flange 16 but also extends along the stepped portion formed by the flanges 17 and 18 and across the outer edge 23 of the flange 17 up to the insulating backing layer 20. When this layer, in the instant case the silver layer, is thus formed, the mold is removed from the tank and a soft rubber split ring 24 is disposed in position encircling the flange 17 and resiliently clamping the edge of the thin metal layer 22 to the mold facing layer 12 on the exposed side of the flange 17. This rubber ring acts not only to hold the layer 22 to the mold but also acts as a means for stopping off subsequent deposits on the portion of the layer 22 positioned within and protected by the insulating ring 24. With this ring in place, the mold is replaced in the electrolytic tank, in this case the copper tank, and the depositing operation continued until a layer 25 of any desired thickness has formed on top of and integrally connected with the initial layer 22. The inner edge 26 of the ring 24 sharply defines the relatively thick portion of the layer 25 and there is avoided the usual accumulation of deposited metal which has a tendency to collect at the place corresponding to the point 26 when other forms of blocking means, such as metallic conductors are used at this place.

When the desired thickness of material 25 is attained, the ring 24 is removed and as ordinarily the formed shell as shown in Fig. 5 will be held by suction to the mold, it will be necessary to break the suction effect by prying away the thin edge of the initially deposited portion 22 engaging the flange 17 or otherwise conventionally separate the finished shell from the mold. The surplus material in the flange 27 is cut away along the line 21 and there is finally produced the reflector shown in Fig. 5 with the flange 27 removed after which the outstanding flange 28 may be suitably drilled to provide fastening apertures 29.

It is within the scope of this disclosure to deposit a layer of chromium, silver or other suitable metal on the initial layer 12 to any desired thickness and thereafter any suitable metal such as copper may be deposited electrolytically on the chemically laid chromium or silver as herein indicated in finishing the article.

In practice, it has been found that the working mold can be used for a hundred or more times without any treatment between succeeding uses. Eventually, the brilliant polish-like surface at 12 begins to show wear and otherwise becomes deteriorated to an extent such that the reflective surfaces 30 on the reproduced shells 25 begin to lose their brilliancy or otherwise depart from the characteristics of the mold. Should the surface 12 simply become slightly scratched either during use or at the time it was removed from the mold 10, it is suggested that the defective portion might be polished as is usual with polished metal surfaces but it is a feature of this disclosure that the chromium face of the mold is not polished and in fact it is prescribed that the working mold be not touched in any way after its removal from the master mold except for the initial hydrogenizing treatment above outlined.

When the chromium surface becomes worn, damaged or otherwise deleteriously affected, it may be readily dissolved by positioning the mold without its backing 20 or ring 24, for a short time in a solution of hydrochloric acid after which the resulting form 13 with the insulating backing 20 thereon is positioned in the chromium containing electrolytic bath and the chromium surface reformed. As the chromium layer is extremely thin, the surface refinished will be identical with the similar surface when formed initially on the master mold.

While I have shown and described, and have pointed out in the annexed claims, certain novel features of the invention, it will be understood that various omissions, substitutes and changes in the form and details of the device illustrated and in its operation may be made by those skilled in the art without departing from the spirit of the invention.

I claim:

1. In the art of forming articles electrolytically, the method which consists in providing a master mold having a highly polished metallic surface, subjecting the same to the action of an electrolytic bath containing chromium to form on said highly polished surface a thin layer of chromium having a surface exactly the complement of the highly polished master mold surface and possessing the highly polished light reflecting characteristics of such surface, forming a backing layer of metal on said thin chromium layer to form a working mold, positioning a layer of insulating material on said backing layer leaving the edge and the chromium faced surface of the working mold exposed, subjecting the working mold with one side so insulated to the action of an electrolytic bath until a thin initial coating of metal has formed on the exposed surface, positioning a ring of resilient insulating material about the edge of the working mold to block off further deposits thereon and to clamp the edge of the initial coating to the chromium surface, continuing to subject the working mold with its initial layer of metal so clamped to the action of said electrolytic bath until the layer is of the desired thickness, removing the clamping ring, removing the formed layer from the working mold and trimming off the portion of the initial layer which was covered by the ring.

2. In the art of forming metallic reflectors and other articles characterized by having portions with highly reflective surfaces, the method which consists in forming a thin layer of chromium on a highly polished master mold, backing said layer to form a working mold, subjecting the chromium surface to a hydrogenizing treatment, subjecting the working mold with its chromium surface so treated to the action of an electrolytic bath to form thereon a thin initial layer of metal capable of forming a brilliant reflective surface, temporarily securing said thin layer to the working mold and continuing to subject it to the action of the electrolytic bath until the desired thickness of metal is attained, and removing the securing means to permit the layer to be separated from the chromium surfaced working mold.

3. In the art of producing three dimension facsimiles accurate to molecular proportions, the method which consists in providing a mold having a surface the complement of the surface to be reproduced, said mold surface defined by a layer of chromium initially subjecting said chromium surface to the action of an electrolytic bath containing a solution of sulphuric acid and successively subjecting said surface to the action of an electrolytic bath to form thereon layers of metal, one after the other, without intermediate treatment of the mold between succeeding depositions, and separating from the mold the successively formed layers of said metal without distorting the same.

4. In the art of forming articles by electrolytic deposition, the method which consists in providing a mold the surface of which is to be reproduced and formed of electrolytically deposited chromium, subjecting said surface to a hydrogenizing treatment, subjecting said mold surface to the action of an electrolytic bath to form a layer of metal thereon, removing said layer and again subjecting the mold surface to the action of an electrolytic bath to form a second layer and repeating said deposition action without any treatment of the chromium mold surface between the succeeding depositions thereon of the metal layers.

5. In the art of forming articles electrolytically, the method which consists in forming a layer of chromium electrolytically on a master mold having a highly polished deposit receiving surface, subjecting said chromium layer used as a working mold to the action of an electrolytic bath to form thereon a thin initial layer of metal, mechanically clamping said metal layer at its edge to the chromium layer to hold the same temporarily in place, blocking off further depositions at said clamped edge while exposing other portions of the initial layer and continuing to subject said initial layer while clamped to the chromium layer to the action of the electrolytic bath until said other exposed portion of the metal layer has reached the desired thickness and removing said layer so formed from the working mold.

6. In the art of forming flanged reflectors electrolytically, the method which consists in forming initially a thin layer of metal on a working mold, mechanically clamping said layer to the mold at said shouldered portion by means which will act to block off succeeding deposits from the portion of the layer so clamped, continuing to subject the exposed portions of the layer to the action of said electrolytic bath, removing the combined blocking off and clamping means and cutting the formed layer at the outer edge of said flange.

7. A mold for use in an electrolytic bath in forming flanged parabolic reflectors and similar shaped articles, said mold comprising a curved parabolic portion outlined by an outstanding Z-shape comprising an inner flange, an outer flange and a connecting transverse flange, one side of said mold including one side of the parabolic portion and the adjacent side of the Z-shape being of insulating material, and the opposite side of said mold being of a conducting material and annular means including the exposed edge of the outer flange for stopping off deposits on the side faces of the outer flange while permitting the forming of a deposited layer on the face of the mold defined by the conducting material and within the outlines of said annular means.

8. A working mold for use in an electrolytic bath, comprising a hollow metal form having a curved side thereof faced with a layer of electrolytic metal and the other side faced with a removable layer of insulating material, and insulating means for closing the joint between the electrolytic metal face and the layer of insulating material.

9. In a device for use as a cathode in an electrolytic bath, the combination of a mold with one side thereof defined by a conducting material and the other side defined by an insulating material, and having an outlining edge, and an annular ring of insulating material demountably positioned on the mold enclosing said outlining edge and acting to stop off deposition from forming at said edge while leaving the portion of the conducting surface within said ring exposed for receiving thereon an electrolytic deposit.

10. In a device for use as a cathode in an electrolytic bath, the combination of a mold having an outlining edge and a deposit receiving surface, an elastic ring of insulating material enclosing said edge in clutching engagement with the mold and acting to define the outlining edge of the deposit formed on said surface.

11. A working mold for use in an electrolytic bath comprising a nickel form having on one side thereof a layer of electrolytically deposited chromium and having the other side faced with a layer of insulating material and a soft rubber ring encircling the mold and enclosing the edges of said layer.

12. A mold for use in forming flanged parabolic reflectors, comprising a metal form having a central parabolic portion outlined by an outstanding flanged portion one side of said form defined by a layer of electrolytically deposited and easily removable metal, the opposite side defined by a layer of insulating material, and a ring of elastic and insulating material adapted to be disposed in position encircling the flanged portion for enclosing the edges of the mold and for securing thereto deposits formed on the layer of metal prior to positioning the ring in place.

Signed at New York in the county of New York and State of New York, this 15th day of August, A. D. 1929.

BLASIUS BART.